Patented Feb. 5, 1952

2,584,639

UNITED STATES PATENT OFFICE 2,584,639

CARBOXYALKYLMERCAPTO STIBONIC ACID COMPOUNDS

Norbert Steiger, Nutley, and Oscar Keller, Clifton, N. J., assignors to Hoffmann-La Roche Inc., Nutley, N. J., a corporation of New Jersey No Drawing. Application July 13, 1948, Serial No. 38,568

6 Claims. (Cl. 260—446)

The present invention relates to aryl- and nitroheterocyclic stibonic acids which contain as a nuclear C-substituent a carboxyalkylmercapto group (—S—alkyl—COOH), and the salts thereof. This application is a continuation-in-part of our application Serial No. 676,863, filed June 14, 1946, now abandoned.

The new stibonic acids can be represented by the following formula:

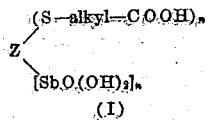

(I)

wherein Z stands for an aryl or nitroheterocyclic radical and n for a small integer, such as 1 or 2. Z, for example, can represent a substituted or unsubstituted aryl radical, as for example, phenyl, diphenyl, naphthalene, or a pyridyl radical, free from substituents; or containing substituents such as aliphatic, halogen, alkoxy, carboxy, sulfoxy, acylamino radicals, and the like. The compounds of Formula I can be converted into the corresponding carboxylate salts, as for example, the metal salts, such as the alkali metal and alkaline earth metal salts; and the nitrogen salts, as for example, the ammonium and organic amine salts.

In general, the compounds of Formula I can be prepared by reacting a diazotized-aminoaryl- or amino-nitroheterocyclic-mercaptoalkylocarboxylic acid with an antimonite, such as sodium antimonite. The reaction can be illustrated by the following equation:

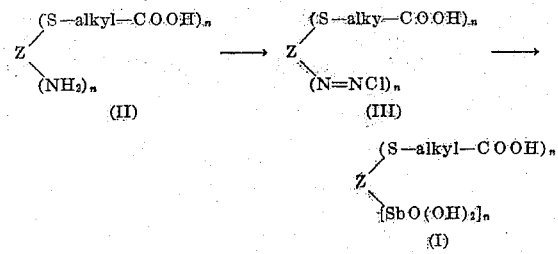

Z and n in the above equation having the same significance as in Formula I. For example, the simplest representative of these compounds; namely, 2 - carboxy - methylmercaptobenzenestibonic acid can be prepared from 2-amino-phenyl-thioglycollic acid by reacting its diazo compound with antimonite according to the following equation:

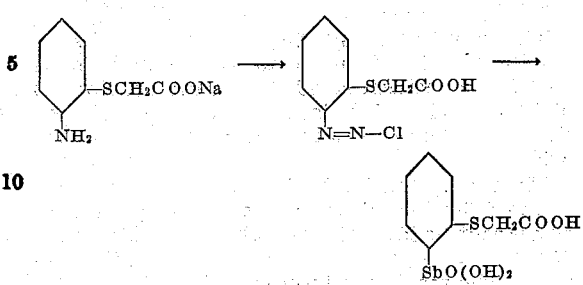

A preferred procedure of preparing the new compounds can be illustrated by the following schematic equation:

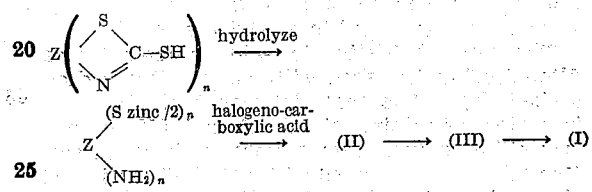

Z and n have the same significance as hereinabove described.

The 2 - mercapto - aryl- or nitroheterocyclic-thiazole (IV) is hydrolyzed with an alkali, as for example, sodium hydroxide to form the amino-thiol (V) which is recovered in the form of its zinc derivative. The latter is condensed with a halogeno-aliphatic carboxylic acid, in alkaline solution, as for example, chloracetic, α-bromopropionic acid or β-bromopropionic acid to form the aminoaryl- or amino-nitroheterocyclic-mercaptoalkylcarboxylic acid of Formula II. This is diazotized and the diazonium compound (III) reacted with antimonite to form the desired stibonic acids and their salts (I).

The new stibonic acids and their salts are characterized by their remarkable chemotherapeutic activity in trypanosomal and *Leishmania donovani* infections of laboratory animals. The aqueous solutions of the water-soluble salts when injected subcutaneously or intravenously, are less irritating than other stibonic acids which have been therapeutically used.

The following examples will serve to illustrate the invention:

EXAMPLE 1

*Preparation of the stibonic acid derivative of phenyl-thio-glycollic acid*

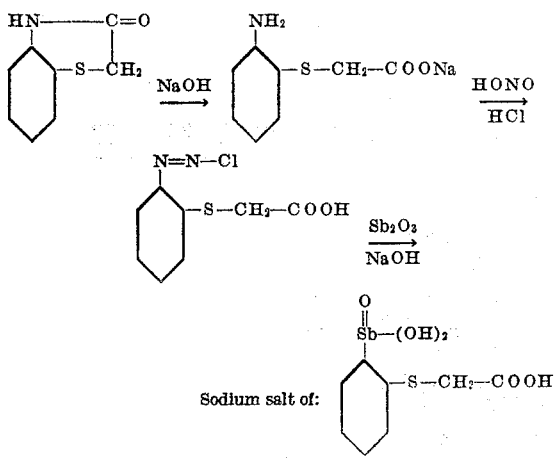

Sodium salt of:

39 grams (0.23 mol) of the lactam of phenyl-thioglycollic acid were hydrolyzed by refluxing with 175 cc. 2 N NaOH (0.35 mol) for 18 hours.

The clear brown solution was diazotized by dissolving in it 18 grams (0.25 mol) $NaNO_2$ and adding the solution dropwise to 200 grams crushed ice + 77 cc. concentrated HCl with stirring at 0°–5° C. The diazotized solution was filtered through "Celite" (diatomaceous earth) in the cold.

The filtrate was kept cold and was slowly added to the following mixture: 30 grams $Sb_2O_3$ + 90 cc. 40 per cent NaOH + 85 grams glycerine + 300 grams $H_2O$ + 3 grams copper dust at 15–25° C. with stirring. The reaction mixture was brought to faint alkalinity to phenolphthalein with concentrated HCl and was then saturated with $CO_2$. The solution was filtered through "Celite" and acidified to Congo with concentrated HCl. The resulting suspension was cooled in a refrigerator.

The separated stibonic acid compound was filtered off and washed with water. It was then sucked dry. The material was then dissolved in water containing about 0.5 mol (70 grams) crystalline sodium acetate (volume about 1 liter). The solution was stirred with "Norite" (activated charcoal) and "Celite" for 1½ hours.

The solution was filtered. The filtrate was acidified with concentrated HCl to Congo. The precipitate was filtered off, washed with a little cold water and dried in vacuo at 50° C.

The new stibonic acid is of nearly white color, amorphous. It is easily soluble in an aqueous sodium acetate solution which can be readily used for injections. It is also soluble in aqueous diethanolamine, the solution being suitable for injection.

The stibonic acid can be purified from any inorganic impurities by dissolving it in methanol and subsequently precipitating it with ether.

EXAMPLE 2

320 grams of the zinc mercaptide of 2-amino-benzenethiol are finely powdered and suspended in a mixture of 250 cc. of ethanol and 3 liters of water. In a separate vessel, 200 grams of monochloracetic acid are covered with 500 grams of crushed ice and 500 cc. of 40 per cent NaOH are added with stirring. The alkaline solution is then added to the suspension of the zinc mercaptide of 2-amino-benzenethiol and the mixture is heated at 50° C. for three hours with stirring.

After standing for sixteen hours, the mixture is heated to 80° C. and is filtered with activated charcoal. The purplish filtrate is cooled to room temperature and to it is added a solution of 140 grams of $NaNO_2$ in 400 cc. of water. The solution is slowly added under the surface to a mixture of 500 grams of ice, 500 cc. of concentrated HCl and 1 gram of $NaNO_2$ with stirring. The temperature is kept between 0° and 5° C. The diazotization takes about three hours.

The diazotized solution is then rapidly filtered with activated charcoal and the cold filtrate is slowly run into a mixture of 240 grams of antimony trioxide, 600 cc. of 40 per cent NaOH, 1500 cc. of water, 640 grams of glycerine and 5 grams of copper dust with stirring. This takes about one hour. Stirring is continued for three hours.

After standing for about sixteen hours, concentrated HCl is added to the reaction mixture until it is barely alkaline to phenolphthalein. The solution is then saturated with $CO_2$ gas (1 hour). The mixture is then filtered with activated charcoal. The filtrate is cooled to 10° C. and HCl is added until the solution gives purple color with Congo paper. The mixture is stirred one hour in the cold and the precipitate of the crude stibonic acid is filtered off. The precipitate is washed with some cold water and the cake pressed dry.

The cake is dissolved in a solution of 160 grams $NaHCO_3$ in 2000 cc. of water. 2 liters of water are added then and the solution is cooled to 10° C. HCl is then added slowly until a pH of 4.2–4.3. The mixture is stirred 1 hour in the cold and the dark precipitate is filtered off. The filtrate is again cooled to 10° and HCl is added to Congo blue. After stirring for one hour in the cold, the pure light colored 2-carboxymethylmercaptobenzene-stibonic acid is filtered off, washed acid free with ice water and is dried in vacuo.

100 grams of the stibonic acid are shaken with 350 cc. of methanol and 30 grams of anhydrous $Na_2SO_4$ for two hours. The clear brown solutions is filtered and added to 7 liters of ether with stirring. After standing for sixteen hours in the cold, the purified stibonic acid is filtered off, washed with ether and is dried in vacuo.

Various salts of the 2-carboxymethylmercaptobenzene-stibonic acid can be prepared, as for example:

1.5 grams of the stibonic acid is stirred with 25 cc. water and 0.5 cc. diethanolamine. The filtered solution contains the diethanolamine salt.

1.5 grams of the stibonic acid is stirred with 25 cc. of water and 1 cc. diethylamine. The filtered solution contains the diethylamine salt.

1.5 grams of the stibonic acid is stirred with 25 cc. of water and 0.5 cc. triethanolamine. The filtered solution contains the triethanolamine salt.

10 grams of the stibonic acid are stirred with 150 cc. of water and 10 grams of $CaCO_3$ for three hours. The mixture is filtered and the clear filtrate is concentrated to dryness in vacuo to obtain the calcium salt.

5 grams of the stibonic acid are stirred with 100 cc. of water and 5 grams of $MgCO_3$ for two hours. The filtered solution contains the magnesium salt and has a pH of 7.9.

5 grams of the stibonic acid are stirred with 100 cc. of water and 10 grams of $BaCO_3$ for 2 hours. The filtered solution contains the barium salt and has a pH of 5.6.

60 grams of purified stibonic acid are stirred with 1000 cc. water and 60 grams CaCO₃ for three hours with nitrogen bubbling through the mixture. The filtered solution is then saturated with nitrogen for 40 hours. The solution is then passed through a Berkfeld candle with nitrogen bubbling through it. Addition of 10 grams of sarcosine anhydride and dilution to 1200 cc. gives a stable 5 per cent solution of the calcium salt. Ampules prepared from the solution remain stable for 500 hours at 45° C.

EXAMPLE 3

*1-carboxymethylmercapto-2-naphthalene-stibonic acid*

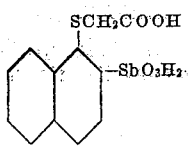

0.25 mol of the sodium salt of 2-amino-naphthalene-thioglycolic acid was dissolved in 500 cc. of water. 18 grams of sodium nitrate were added and the solution was diazotized by addition to a mixture of 100 cc. of concentrated HCl and 100 grams of ice at 0° to 5° C. The diazo solution was filtered and added to a mixture of 30 grams of antimony trioxide, 80 grams of glycerine, 100 cc. of 40 per cent NaOH, 2 grams of copper dust and 200 cc. of water. The stibonic acid was precipitated by acidification with HCl and purified by reprecipitation from dilute sodium acetate solution.

EXAMPLE 4

*2,4-bis-(carboxymethylmercapto)-1,5-benzene-distibonic acid*

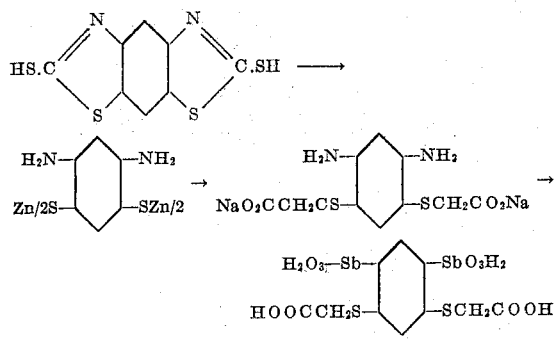

0.125 mol of 2 - di - mercaptobenzothiazole was converted to the amino-thiol by alkaline hydrolysis with sodium hydroxide. The thiol was isolated by treatment with zinc chloride in the form of the zinc derivative. This was condensed with 0.25 mol of chloroacetic acid in alkaline solution. The di-amino-thioglycollate thus obtained was diazotized by dissolving 18 grams of NaNO₂ in the solution and slowly adding it to a mixture of 60 cc. HCl, 100 grams of cuprous chloride, and 1 gram NaNO₂ at 0° to 5° C. The diazo solution was filtered and added to a mixture of 30 grams antimony trioxide, 80 grams of glycerine, 80 cc. of 40 per cent NaOH, 200 cc. of water and 2 grams of copper dust. After warming to 45° C. the stibonic acid was precipitated by acidification with hydrochloric acid, and purified by reprecipitation from dilute sodium acetate solution. The sodium salt solution has a good trypanocidal activity.

EXAMPLE 5

*2-(carboxymethylmercapto)-pyridino-5-stibonic acid*

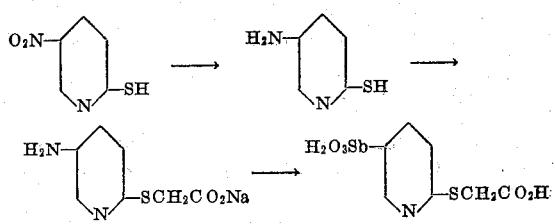

5-nitro-2-thiolpyridine was prepared according to Phillips and Shapiro, Journal of the Chemical Society (London), 1942, page 584.

31.2 grams (0.2 mol) of 5-nitro-2-thiolpyridine were suspended in 300 ml. of water, and 120 grams of sodium hydrosulfite was added with stirring, keeping the temperature below 50° C. When all was in solution, it was diluted with 200 ml. of water, filtered from any impurities, and the filtrate added to a solution of 20 grams of zinc chloride in 150 ml. of water. There was obtained the zinc derivative of 2-thiol-5-aminopyridine as a white amorphous precipitate. This was filtered, the filter cake sludged with water, made alkaline with 30 cc. of NaOH solution (40% by volume) and condensed with an alkaline solution of 20 grams of monochloracetic acid at 40–50° C. It was filtered from impurities. To the filtrate was added a concentrate aqueous solution of 14 grams of sodium nitrite. It was run into 80 cc. of concentrated HCl and crushed ice below +5° C. The obtained diazo compound was added at 15 to 20° C. to a sludge of 50 grams of Sb₂O₃, 140 cc. of NaOH (40% by volume), 3 grams of copper powder, 120 grams of glycerine and 400 cc. of water. After disappearance of the diazo-reaction it was almost neutralized with HCl, then saturated with CO₂. It was filtered from Sb₂O₃ and acidified with HCl. There were obtained after drying about 30 grams of the stibonic acid as a light tan powder. It was soluble in NaHCO₃ or dilute diethanolamine, and formed the corresponding sodium and diethanolamine salts.

EXAMPLE 6

*2-carboxyethylmercapto-benzene-stibonic acid*

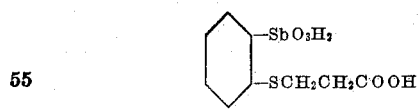

0.25 mol of the zinc mercaptide of 2-aminobenzenethiol was suspended in 250 cc. of water and 25 cc. of 40 per cent NaOH. The mixture was treated with a cold solution of 0.25 mol β-brompropionic acid containing 40 grams of sodium carbonate in 200 cc. water. The reaction was completed by heating at 50° C. for two hours. After filtration, the solution was diazotized by dissolving 18 grams of NaNO₂ in the filtrate and slowly adding it to a mixture of 60 cc. of concentrated HCl and 100 grams of ice at 0° C. to 5° C. The diazo solution was filtered and added to a mixture of 30 grams of antimony trioxide, 80 grams of glycerine, 100 cc. of 40 per cent NaOH, 2 grams of copper dust and 200 cc. of water. The stibonic acid formed was precipitated by acidification and purified by reprecipitation from dilute sodium carbonate solution.

By using α-brompropionic acid in the same way, there is obtained 2-(α-carboxyethylmercapto)-benzene-stibonic acid:

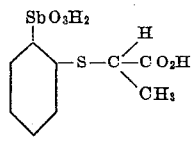

The diethanolamine salts of both compounds show in solution a very distinct trypanocidal activity.

EXAMPLE 7

*2-carboxymethylmercapto-4-acetamido-benzene-stibonic acid*

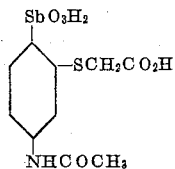

To a solution of 105 grams of the sodium salt of 4-acetamido-2-carboxymethylmercapto aniline in 1000 cc. of water were added 32 grams of sodium nitrite. This was run under the surface of 1000 cc. of water, 500 grams of ice, 110 cc. of concentrated HCl with agitation and cooling—maintaining a temperature of 0° C. to +5° C. during the addition. The diazo compound was filtered and added at +15° to +20° C. slowly to a sludge of 30 grams of $Sb_2O_3$, 80 cc. of NaOH (40%), 80 grams of glycerine, 200 cc. of water, 2 grams of Cu powder. After standing overnight, it was saturated with $CO_2$, filtered, and the filtrate acidified. The precipitated stibonic acid was filtered, washed with water, and finally dried.

EXAMPLE 8

*2-carboxymethylmercapto-4-methoxy-benzene-stibonic acid*

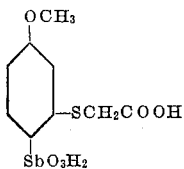

40 grams of 2-mercapto-4-methoxy-aniline were condensed with 25 grams of monochloracetic acid in a 5 per cent NaOH solution. The resulting 2-carboxymethylmercapto-4-methoxy-aniline was diazotized with 21 grams of $NaNO_2$ in the presence of 165 cc. of concentrated HCl and ice at 5 to 10° C. The diazo solution was then reacted with a mixture containing 40 grams of antimony trioxide, 100 grams of glycerine, 90 cc. of 40 per cent NaOH, 200 cc. of water and 3 grams of copper dust. The stibonic acid was precipitated by acidification with HCl and purified by precipitation from a 10 per cent sodium acetate solution.

EXAMPLE 9

*2-carboxymethylmercapto-4-methyl-benzene-stibonic acid*

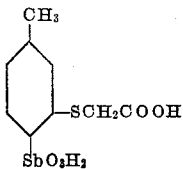

45 grams of the zinc derivative of 2-amino-5-methyl-benzenethiol were condensed with 25 grams of monochloracetic acid in 500 cc. of water containing 75 cc. of 40 per cent NaOH. The resulting 2-carboxymethylmercapto-4-methyl-aniline was diazotized with 19 grams of $NaNO_2$ in the presence of 85 cc. of concentrated HCl and ice at 0° to +5° C. The diazo solution was reacted with a mixture containing 30 grams of antimony trioxide, 90 cc. of 40 per cent NaOH, 80 grams of glycerine, 200 cc. of water and 2 grams of copper dust. The stibonic acid was precipitated by acidification with HCl and purified by reprecipitation from 800 cc. of 10 per cent sodium acetate solution with HCl.

EXAMPLE 10

*2-carboxymethylmercapto-4-chloro-benzene-stibonic acid*

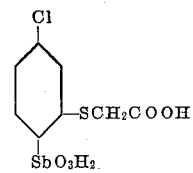

30 grams of 2-mercapto-4-chloro-aniline were condensed with 20 grams of monochloracetic acid in 500 cc. of water containing 40 grams of NaOH. The resulting 2-carboxymethylmercapto-4-chloroaniline was diazotized with 18 grams of $NaNO_2$ in the presence of 90 cc. of concentrated HCl at 0° to 5° C. The diazo solution was reacted with a mixture containing 30 grams of antimony trioxide, 80 cc. of 40 per cent NaOH, 200 cc. of water, 80 grams of glycerine and 2 grams of copper dust. The stibonic acid was precipitated by acidification with concentrated HCl and purified by reprecipitation from 500 cc. of 10 per cent sodium acetate solution with HCl.

EXAMPLE 11

*3-carboxymethylmercapto-benzene-stibonic acid*

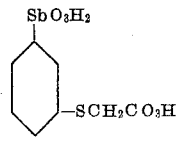

31 grams of 3-carboxymethyl-mercapto-aniline were dissolved in 40 cc. of concentrated HCl and 300 cc. of water. The solution was chilled to 0° C., and diazotized with a solution of 12.5 grams of $NaNO_2$ in 50 cc. of water at a temperature of between 0° to +15° C. The diazo compound was dropped into a slurry consisting of 22 grams of $Sb_2O_3$, 60 cc. of NaOH (40% by volume), 150 cc. of water, 1.6 grams of copper powder, 64 grams of glycerine at 15° to 25° C. After six hours stirring, the reaction mixture was neutralized with 4 cc. of concentrated HCl then saturated with carbon dioxide, and filtered. Upon acidification of the filtrate with hydrochloric acid the new stibonic acid was obtained. It was purified by redissolving at room temperature in a dilute aqueous $NaHCO_3$ solution, filtration and acidification with HCl. The 3-carboxymethyl-mercapto-benzene-stibonic acid was obtained as a light tan powder after drying at room temperature in vacuo.

A solution of the stibonic acid in dilute diethanolamine shows high activity in trypanocidal infections of animals.

By using the 4-carboxymethylmercapto-aniline as a starting material, there was obtained the 4-carboxymethylmercapto-benzene-stibonic acid, which also shows good trypanocidal activity.

EXAMPLE 12

*4-carboxy-2-carboxymethylmercapto-benzene-stibonic acid*

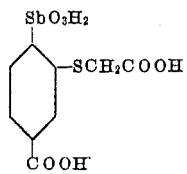

23 grams of the zinc derivative of 2-amino-5-carboxy-benzenethiol were condensed with 10 grams of monochloracetic acid in a 12 per cent NaOH solution. The resulting 2-carboxymethylmercapto-4-carboxy-aniline was diazotized with 10 grams of NaNO₂ in the presence of 60 cc. of concentrated HCl and ice at 0° to +5° C. The diazo solution was then reacted with a mixture containing 15 grams of antimony trioxide, 50 cc. of 40 per cent NaOH, 1 gram of copper dust, 35 grams of glycerine and 100 cc. of water. The desired compound was precipitated by acidification with HCl and reprecipitated from 300 cc. of a 10 per cent sodium acetate solution with HCl.

In a manner similar to that described in the above examples, other stibonic acids of Formula I can be prepared. Thus there has also been prepared the following stibonic acids which can be represented by the following formulae:

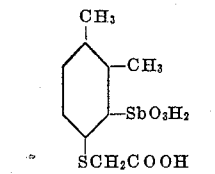 (a)

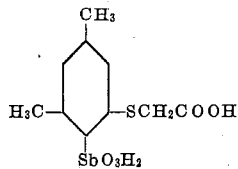 (b)

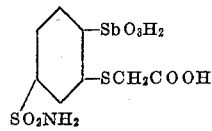 (c)

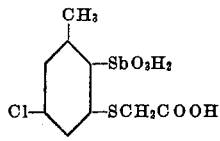 (d)

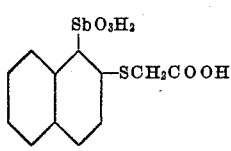 (e)

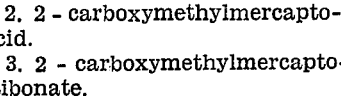 (f)

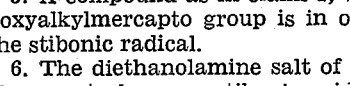 (g)

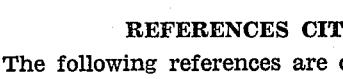 (h)

 (i)

 (j)

We claim:
1. A phenyl stibonic acid having as a nuclear C-substituent a carboxyalkylmercapto group and the salts thereof.
2. 2 - carboxymethylmercapto-benzene-stibonic acid.
3. 2 - carboxymethylmercapto-benzene-sodium stibonate.
4. 2 - carboxymethylmercapto-benzene-calcium stibonate.
5. A compound as in claim 1, wherein the carboxyalkylmercapto group is in ortho position to the stibonic radical.
6. The diethanolamine salt of 2-carboxymethylmercapto-benzene-stibonic acid.

NORBERT STEIGER.
OSCAR KELLER.

REFERENCES CITED

The following references are of record in the file of this patent:

UNITED STATES PATENTS

| Number | Name | Date |
| --- | --- | --- |
| 2,185,972 | Bockmuhl et al. | Jan. 2, 1940 |

FOREIGN PATENTS

| Number | Country | Date |
| --- | --- | --- |
| 216,270 | Germany | Oct. 9, 1908 |
| 484,101 | Great Britain | May 2, 1938 |

OTHER REFERENCES

Broshmachari: Indian Jour. Med. Res. 10, 510 (1922–1923).

Sidwick: Organic Chemistry of Nitrogen, page 522 (1944 edition).